United States Patent [19]

Rutherford et al.

[11] Patent Number: 4,459,188

[45] Date of Patent: Jul. 10, 1984

[54] BRINE SYSTEMS FOR CHLOR-ALKALI MEMBRANE CELLS

[75] Inventors: John Rutherford; Raymond W. Ver Hoeve, both of Houston, Tex.

[73] Assignee: Texas Brine Corporation, Houston, Tex.

[21] Appl. No.: 417,396

[22] Filed: Sep. 13, 1982

[51] Int. Cl.³ .................. C25B 15/08; C25B 1/14; C25B 1/18; C25B 1/34

[52] U.S. Cl. ..................... 204/98; 204/128; 159/47.1

[58] Field of Search ............ 204/98, 128, 129, 232, 204/233, 234, 235, 236, 237, 238, 239; 159/47.1

[56] References Cited

U.S. PATENT DOCUMENTS

| | | | |
|---|---|---|---|
| 3,402,113 | 9/1968 | Tsao | 204/237 |
| 3,403,083 | 9/1968 | Currey et al. | 204/237 |
| 3,616,328 | 10/1971 | Currey et al. | 204/236 |
| 3,745,101 | 7/1973 | Currey et al. | 204/98 |
| 4,176,023 | 11/1979 | Childress | 204/98 |
| 4,209,369 | 6/1980 | Seko et al. | 204/98 |
| 4,214,957 | 7/1980 | Ogawa et al. | 204/98 |
| 4,267,026 | 5/1981 | Patel | 204/98 |

Primary Examiner—R. L. Andrews
Assistant Examiner—Terryence Chapman
Attorney, Agent, or Firm—Peter F. Casella

[57] ABSTRACT

This invention relates to a new and novel brine system for use in electrolyzing salt to chlorine, caustic soda and hydrogen in chlor-alkali cells employing an ion exchange membrane and, more particularly, to the efficient use of brine as the raw material to be electrolyzed in chlor-alkali membrane cells. This invention also relates to a process for the conversion of a diaphragm cell and evaporator plant to one employing membrane type cells while still utilizing the existing brine treatment and caustic evaporation equipment and the resultant plant installations.

10 Claims, 5 Drawing Figures

BRINE SYSTEMS FOR CHLOR-ALKALI MEMBRANE CELLS

BACKGROUND OF THE INVENTION

The unprecedented rise in cost of energy in the United States over the last decade due to the OPEC countries' price control of petroleum has resulted in the cost of energy, especially electrical energy, being increased over fivefold.

Caustic soda and chlorine are produced by the electrolysis of an aqueous solution of sodium chloride in various types of electrolytic cells. Major tonnages of caustic and chlorine were made by the mercury cell process; however, because of pollution and environmental problems, this process, although still used, is giving way to other cell processes which allow for better economics and avoid the mercury pollution problems. Diaphragm cells employ asbestos diaphragms, and since asbestos has become an objectionable pollutant, processes have been developed for stabilizing the asbestos by use of fluoropolymer reinforcements. The latest type of cell, the ion exchange membrane cell which is now being installed for commercial use, avoids many of the objections of the prior chlor-alkali cells.

The cost of producing chlorine and caustic soda by the process which involves electrolyzing salt contained in concentrated brine has been a significant contributor to the rising cost of most consumer materials using chlorine or caustic soda during the course of their manufacture. Significant contributions in lowering the amount of electrical energy necessary for the electrolysis of salt have been made with the introduction of dimensionally stable anodes for use in chlor-alkali cells as a replacement for graphite anodes. Still another significant contribution in lowering the electrical energy costs in the manufacture of chlorine and caustic by the electrolysis of salt has been made by the introduction of ion exchange membrane separators for use in place of asbestos or modified separators. The introduction of chlor-alkali membrane cells which now employ dimensionally stable anodes has caused a further search to improve their energy efficiency. For example, catalytic surfaces for use on the cathodes of chlor-alkali electrolytic cells are being developed. An additional area for realizing cost improvement in the manufacture of chlorine and caustic in membrane cells is in the handling and treatment of the salt, which is a basic raw material required in the electrolysis process.

This invention relates to new and novel processes and systems for treating and handling the brine and salt solutions in the process of making chlorine, caustic and hydrogen in ion exchange membrane electrolytic cells and the resultant plant installations.

THE PRIOR ART

Heretofore, chlor-alkali membrane cell plants have been designed to employ solid salt as the raw material for electrolysis because of the need to reconcentrate the depleted brine solution for the efficient operation of said cells. In the ion exchange membrane process, feed brine is depleted from a salt concentration of about 26% to a salt concentration in the depleted brine or anolyte of about 10% to 21%, depending upon a number of variables in the operation of the cells. The depleted brine contains too much dissolved salt and other values to be thrown away, and further, it is an effluent stream that cannot be disposed of without regard to the environment.

Recent attempts to make improvements in the handling of the brine used in the electrolysis of sodium chloride in membrane cells have been disclosed and claimed in U.S. Pat. No. 4,209,369 granted on June 24, 1980, to Seko et al. This patent discloses a process for the electrolysis of salt in a membrane cell which allows for the use of well brine; that is, natural or solution mined brine, by recycling the depleted sodium chloride solution resulting from the electrolysis and subjecting it to concentration, by evaporation or otherwise, for reuse in the cells.

BRIEF DESCRIPTION OF THE INVENTION

We have found that considerable savings and efficiencies can be obtained in the electrolysis of salt in a chlor-alkali membrane cell employing brine as a starting material by the process which comprises:
  (a) Subjecting said brine to a purification treatment wherein the brine is purified to remove impurities sufficient to make a satisfactory brine feed for electrolysis in chlor-alkali membrane cells,
  (b) Concentrating the so treated brine resulting from Step (a) in an evaporator or slurry concentrator to a slurry containing up to about 30% NaCl solids; and then,
  (c) Combining depleted salt solution exiting from the anode compartment of the membrane cells with the slurry produced by Step (b) to produce a cell brine feed having the desired ratio of salt to water.

Still further, we have found a process for retrofitting an existing chlor-alkali diaphragm cell plant to accommodate the more energy efficient membrane cells while at the same time allowing for the use of the major components of equipment from said diaphragm cell plant, which process comprises the following steps:
  (a) Installing membrane cells and their auxiliary electrical equipment as required in replacement of the diaphragm cells and the electrical equipment in said plant installation,
  (b) Adding a secondary brine treatment process,
  (c) Converting at least one of the evaporator effects used to concentrate the diaphragm cell caustic to a salt concentration effect,
  (d) Feeding purified brine to said evaporator and concentrating said solution to a slurry containing up to 30% solid salt,
  (e) Combining depleted salt solution exiting from the anode compartment of the membrane cells installed in said retrofitted plant installation with the slurry produced in Step (c) to produce a brine feed having the desired ratio of salt to water,
  (f) Employing the remaining evaporator effects for concentration of the caustic liquor produced by the cells to produce the desired concentration of caustic soda,
  (g) Employing the vapors produced from the evaporation of Step (f) as the primary heat source for the salt concentration in Step (c).

In addition, our invention provides a plant installation for producing chlorine, caustic soda and hydrogen in a plurality of chloralkali membrane electrolytic cells having dimensionally stable metallic anodes in an anode compartment, metallic cathodes in a cathode compartment and cation permselective fluorocarbon polymer membranes separating said anode compartments, which comprises:

(a) Means for purifying sodium chloride solution brine to remove impurities detrimental to the maintenance and efficient operation of the membranes, (b) Means for concentrating said purified brine solution to a slurry containing up to 30% crystalline salt, (c) Means for combining the slurry containing the undissolved salt produced in Step (b) with the depleted anolyte liquor produced by the electrolysis of salt resulting from the anode compartment of said cells.

In order that this invention may be more readily understood, it will be described with respect to the following drawings and examples:

DESCRIPTION OF THE INVENTION

The brines that may be employed in this invention may come from any of a number of sources, such as natural or solution mined brines or even brines made from solar salt or rock salt.

The brines are employed in the electrolysis at their normal saturation, which is usually between about 23% to 28% salt dissolved in water. The brines contain impurities, including calcium and magnesium salts, and these are removed in the primary brine treatment system.

Any conventional primary brine treatment system employed in electrolytic decomposition of salt in diaphragm or mercury cells may be used. The systems include means for treating the brine with caustic soda (or cell liquor from the cathode compartment of the membrane cell), sodium carbonate or any other additives that may be necessary to eliminate impurities such as calcium, magnesium, iron, etc. The impurities are removed in a thickener and a filter. The aqueous sodium chloride resulting from the filter may then be passed through a secondary brine treatment system to further purify the brine.

Any of the conventional secondary brine treatment systems associated with membrane cell operations may be employed, such as the ion exchange resin systems using chelating resins. Phosphate treatment of chlor-alkali brines may also be used. Phosphates apparently form a gel coat in the membrane in a way which better maintains the efficiency of the membrane.

Our system is applicable for use in any of the membrane cells using ion exchange membranes, including Nafion membranes, which are fluoropolymers containing pendant sulfonic acid groups such as supplied by E. I. du Pont de Nemours & Company, Inc. Other membranes, including composites of fluoropolymer membranes having sulfonic acid groups, which are composited with those having carboxylic acid groups, phosphoric acid groups, phosphoric acid groups or sulfonamide groups may also be used. Fluorinated membranes, which are not only manufactured by E. I. du Pont de Nemours & Company, Inc., but also by Asahi Chemical Industry, Tokyo; Asahi Glass Co., Yokohama; and Tokuyama Soda Co., Tokyo; may be used.

The salt concentrator equipment may consist of multiple effect evaporators, energy efficient vapor recompressors, or a combination thereof. Proper design of these units with proper use of heat recuperators and elutriation legs has been determined to be energy efficient and the required slurry concentrations easy to control without the need to centrifuge and separate the solid salt from the slurry. Further, proper use of elutriation legs and careful design will allow a range of temperature control of the slurry produced.

Figure 1:
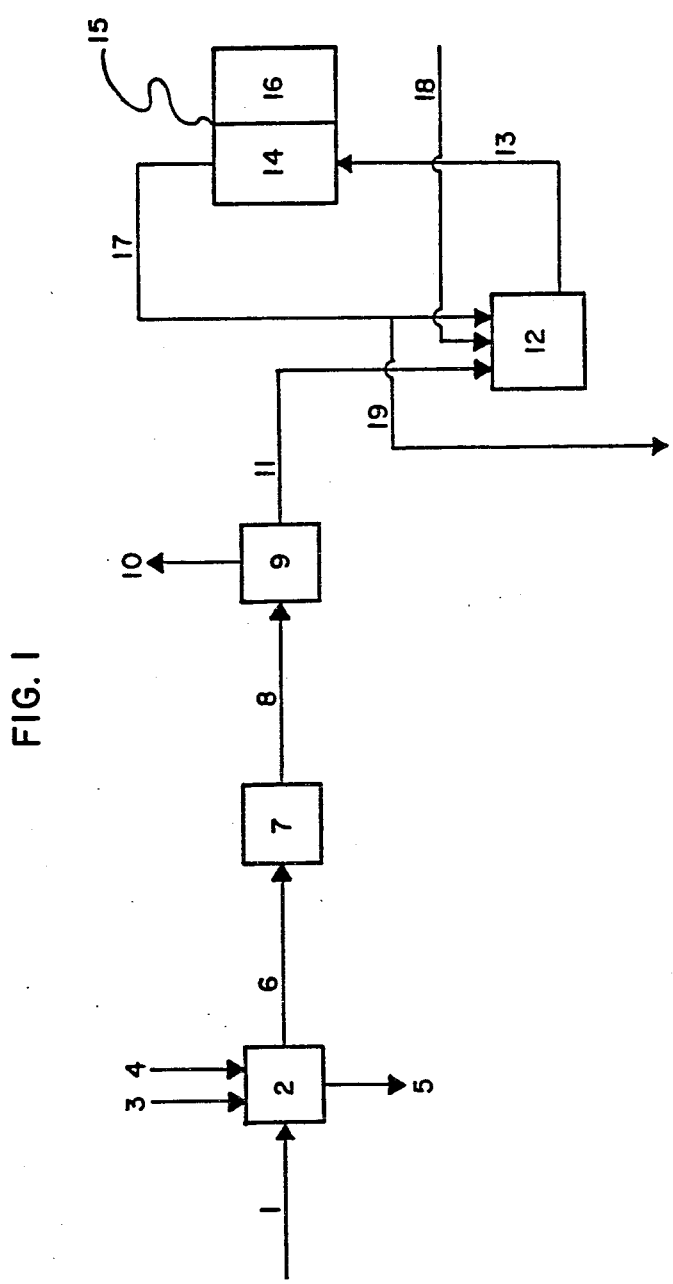
FIG. 1 is a flow sheet of a typical system in accordance with our invention for use in a chlor-alkali plant employing membrane cells.

Referring to FIG. 1, 1 represents the line through which the material or solution mined brine is introduced into the system, 2, to the conventional primary brine treatment system where sodium carbonate and caustic soda are introduced through lines 3 and 4 and sludge formed in the treatment is purged through line 5. Polishing filtration is accomplished following the addition and treatment with chemicals and the treated, filtered brine is exited through line 6. The treated brine enters a secondary brine treatment system (ion exchange), 7, where the brine is further purified to produce a satisfactory level of impurities required in operation of membrane cells. The purified brine exits the secondary brine treatment system through line 8 and is introduced to a salt concentrator, 9. It should be noted that, alternatively, a portion of the brine flow of line 8 may be diverted around salt evaporator, 9, to line 11. Further, the slurry concentrator, 9, may be comprised of one or more effects in a multiple effect evaporator system with the other effects used to concentrate membrane cell caustic soda. The salt concentrator is provided with a water vapor exit line, 10, and the slurry exit line, 11. The slurry may contain up to 30% undissolved crystalline salt. Line 11 is introduced into an anolyte recirculation tank, 12. The anolyte recirculation tank is provided with an exit, 13, which leads to the anode compartment, 14, of the membrane cell, 15, which also has a cathode compartment, 16, and is recycled through line 17 for reconstitution with the slurry. The anolyte recirculation tank, 12, is also provided with line 18 for the introduction of HCl or muriatic acid. Line 17 is provided with a bypass line, 19, for control and purge of accumulated impurities.

It should be noted that FIGS. 1 through 5 are diagramatic sketches of only pertinent functions of this invention. Items such as hydrogen, chlorine, cell liquor and others have been omitted for simplification.

Figure 2:
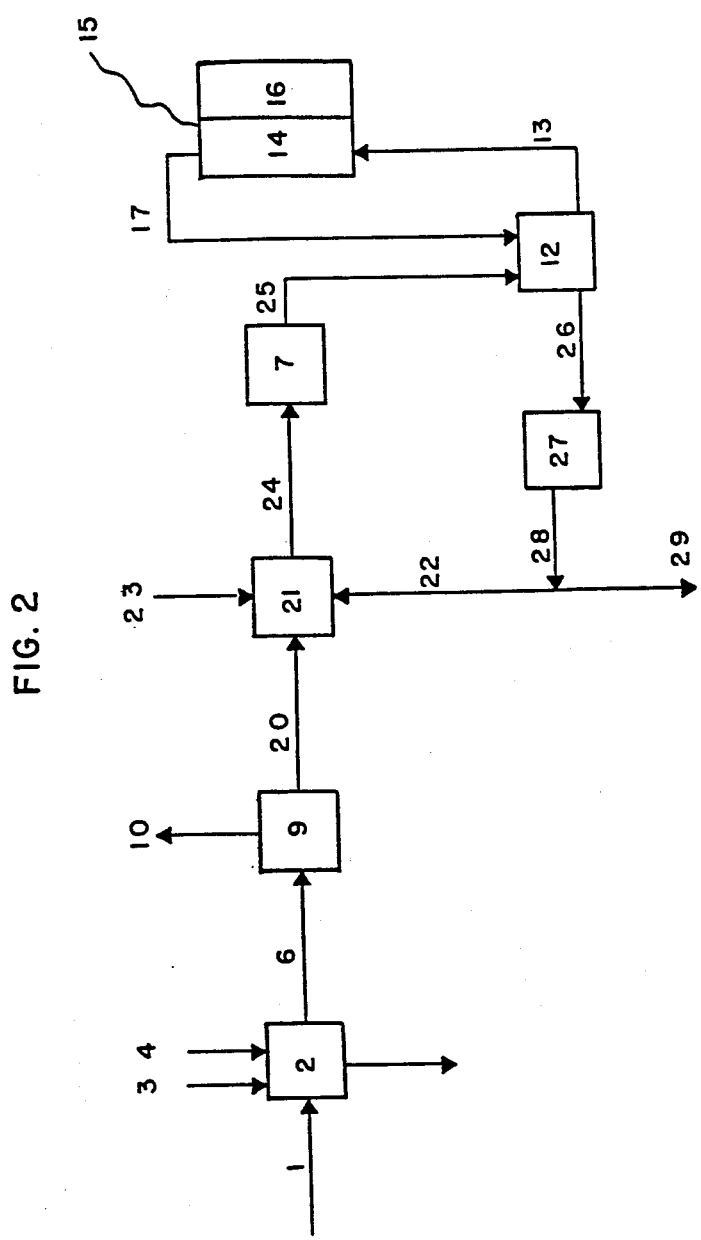
FIG. 2 is a flow sheet of a modification of a typical system given in FIG. 1, which is also in accordance with our invention, for use in chlor-alkali plants employing membrane cells where any accumulated impurities are removed from the brine just before introduction into the cell.

Referring to FIG. 2, natural brine is fed through line 1 to the primary brine system, 2, and then through line 6 to the brine concentrator, 9. This concentrator may be similar to that described in FIG. 1. The brine slurry exits through line 20 to a resaturation system, 21, where it mixes with dechlorinated anolyte brine from line 22. A small amount of caustic soda solution (which may be catholyte cell liquor) is added through line 23 to insure that the brine issuing from the resaturator is above pH 7 as recommended for the secondary brine treatment system, 7. The purified brine stream is then sent through line 25 to the anolyte recirculation tank, 12. The depleted anolyte brine recycle stream, 26, which is recycled to the resaturation tank, 21, is first dechlorinated in dechlorinator 27. The balance of the system in FIG. 2 is similar to that described in reference to FIG. 1.

Figure 3:
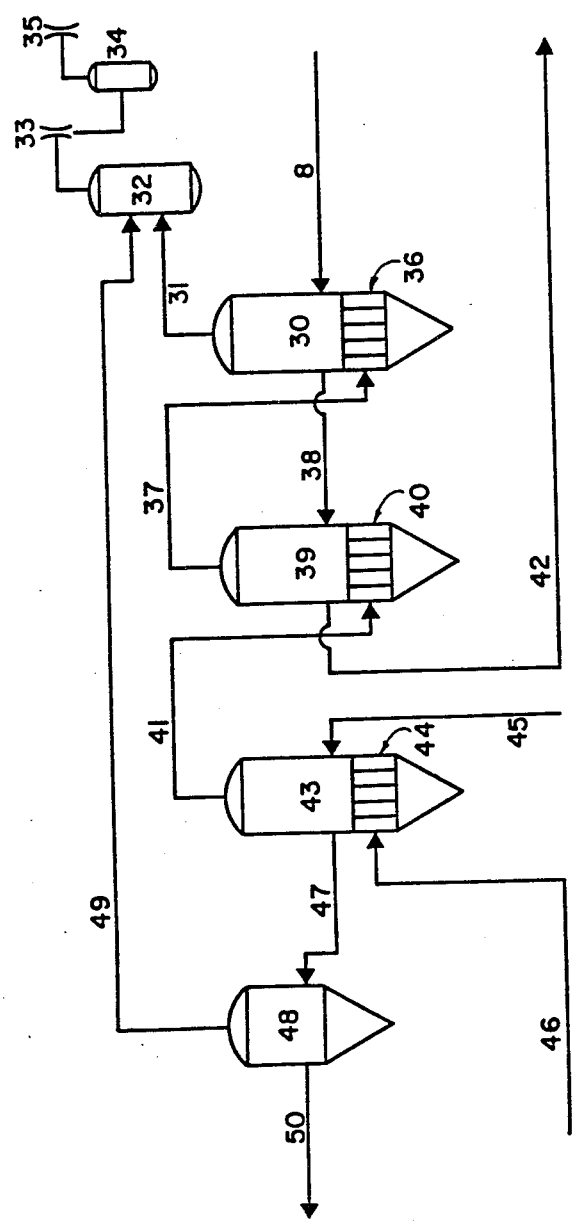
FIG. 3 is a flow sheet of still another system in accordance with our invention for use in retrofitting an existing conventional chlor-alkali diaphragm cell plant having installed multiple effect evaporators for use with membrane cells.

In FIG. 3, 8 is a purified brine stream coming from line 8 of FIG. 1 or line 6 of FIG. 2 and is fed to the third effect body, 30, where second effect vapors, 37, supply heat through the third effect steam chest, 36, to drive off water vapor, 31, to the barometric condenser and vacuum system, 32, 33, 34 and 35. The partially concentrated brine slurry exits through line 38 to the second effect body, 39, where first effect vapors, 41, supply heat through the second effect steam chest, 40, to boil off water vapor, 37. The properly concentrated brine slurry from the second effect body, 39, exits through line 42 at the desired ratio of sodium chloride to water.

Membrane cell caustic liquor is fed through line 45 to the first effect body, 43. Steam, 46, is introduced into the first effect steam chest, 44, to boil off vapors from the first effect body, 43, through vapor line 41. The concentrated caustic soda liquor exits through line 47 to a vacuum flash tank, 48, where the solution is further concentrated and cooled by flashing vapors through line 49 to the barometric condenser, 32. Caustic soda of the desired strength exits through line 50.

Figure 4:
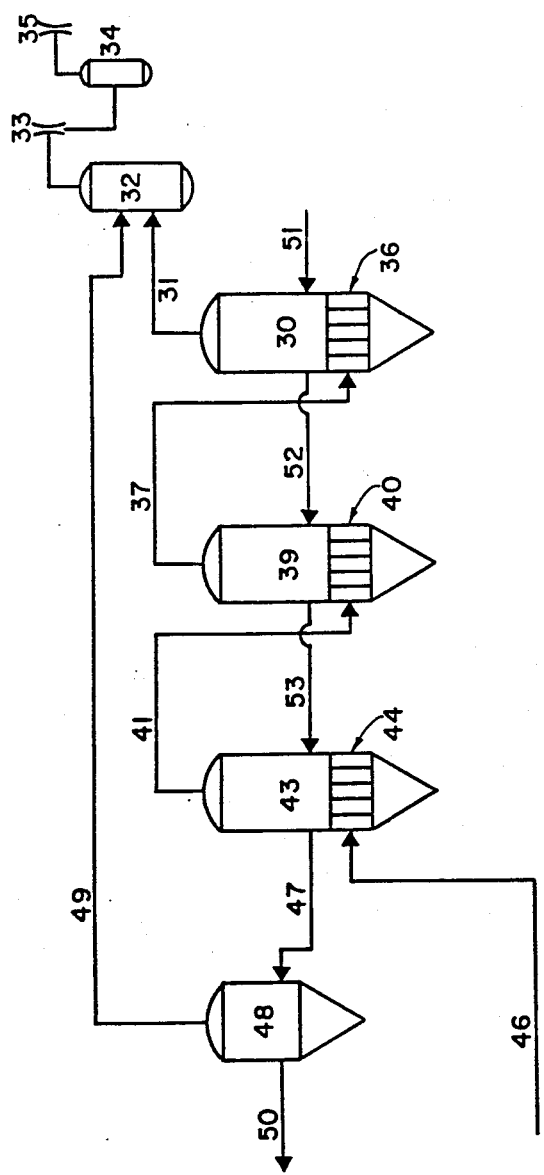
FIG. 4 is a flow sheet of a typical conventional triple effect diaphragm cell evaporator system containing pertinent flows.

FIG. 4 represents a typical triple effect evaporator producing sodium hydroxide as a 50% solution from diaphragm cell liquor. For purposes of simplification, salt removal equipment and such items as condensate flash heat recuperators are omitted and a reasonable heat economy has been assumed.

Diaphragm cell liquor containing 45,500 #/hr is NaOH; 53,500 #/hr NaCl and 298,500 #/hr $H_2O$ for a total of 395,500 #/hr introduced through line 51 into the third effect body, 30, where vapors from the second effect body, 39, are supplied through vapor line 37 to the steam chest, 36, to provide heat to boil off third effect vapor through line 31 to the barometric condenser, 32. Partially concentrated caustic soda solution exits from the third effect body, 30, through line 52 to the second effect body, 39. Here water vapor from the first effect body, 43, is supplied through vapor line 41 to the second effect steam chest, 40, to provide heat to boil off second effect vapor through vapor line 37. The additionally concentrated caustic soda solution exits from the second effect body, 39, through line 53 to the first effect body, 43. Steam 127,500 #/hr is supplied through line 46 to the first effect steam chest, 44, to provide heat to boil off vapor from first effect body, 43, through line 41. The hot concentrated caustic soda solution exits through line 47 to a vacuum flash tank, 48, where the liquor is cooled and more water vapor removed under vacuum through line 49. Caustic soda solution of the desired concentration exits through line 50 containing 45,500 #/hr NaOH and 45,500 #/hr $H_2O$ making a total of 91,000 #/hr. Thus the total water removed in vapor streams 31, 37, 41 & 49 equals 254,000 #/hr. Steam consumption is 127,500 #/hr and short tons of NaOH produced equals 22.75 tons per hour.

Figure 5:
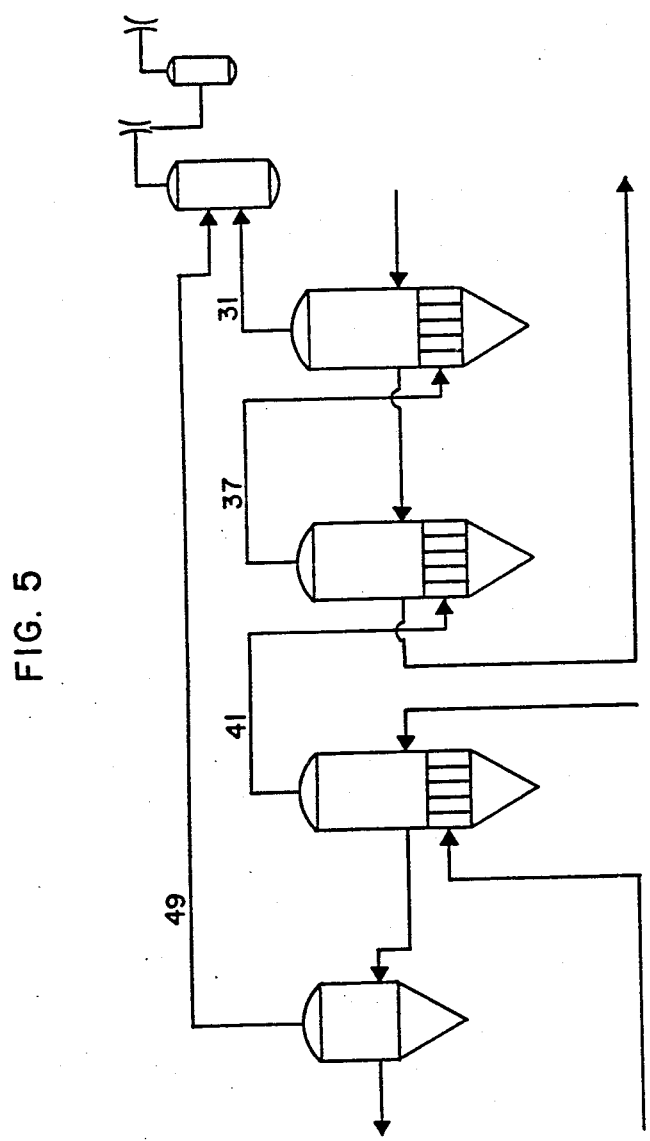
FIG. 5 is a flow sheet of a retrofitted triple effect diaphragm cell evaporator system containing pertinent flows for comparison with FIG. 4.

FIG. 5 represents the same typical triple effect evaporator retrofitted and described in FIG. 3 with pertinent material flows added for comparison with FIG. 4 as will be described later.

The process of this invention is particularly suited to the conversion of existing diaphragm cell installations which operate on solution mined salt in the form of 25.5% NaCl brine (±2.0% NaCl). With minor modifications, existing primary brine treatment systems and multiple effect evaporators are adapted to permit 100% conversion of diaphragm cells to more energy efficient membrane cells. Further, the primary brine treatment and caustic soda and salt concentration equipment will handle at least 140% of the original diaphragm cell installation capacity.

The latest membrane cells are capable of producing chlorine and caustic soda at significantly lower power per ton of chlorine while producing cell liquor containing 25% to 35% sodium hydroxide. Retrofitting from diaphragm to membrane cells provides substantial power and steam savings.

Typically, existing evaporators processing diaphragm cell liquor to 50% caustic soda consist of multiple effect evaporators constructed of corrosion-resistant metals selected to prevent iron and other metal contamination. In most cases, the multiple effect evaporators are satisfactory for sodium chloride brine concentration, as well as caustic soda concentration.

Ten years ago most of the evaporators were triple effect units, but with greatly increased energy costs, the trend has been to install quadruple effect evaporators and, in some cases, existing triple effect units have been converted to quadruple effect operation by adding a fourth effect. FIGS. 4 and 5 illustrate how well the system of this invention adapts to the conversion of an existing diaphragm cell plant to membrane cells. The example chosen is for conversion of a typical triple effect caustic soda evaporator, but the process is not limited to triple effect units. Conversions of quadruple effect units and/or units involving multiple effects and vapor recompression units is feasible and practical.

FIG. 4 represents a typical 500-ton NaOH per day triple effect caustic soda evaporator operating on diaphragm cell liquor containing 10% to 13% NaOH and 10% to 15% NaCl. The cell liquor is concentrated to approximately 50% sodium hydroxide, and during the concentration, the sodium chloride becomes less soluble and crystallizes out of solution. The crystalline salt is removed by cooling, filtering and/or centrifuging and is generally recycled to the cells with a good portion of the recovered salt being recycled first through the primary brine treatment system in the form of brine.

For purposes of illustration, a cell liquor containing 11.5% sodium hydroxide and 13.5% sodium chloride and a product concentration of 50% sodium hydroxide have been selected. To simplify the illustration, salt removal equipment, condensate flash heat recuperation and other heat recuperation devices have been omitted, and a reasonable heat economy has been assumed. In the example selected, approximately 1.98 pounds of water are removed in the evaporator per pound of supplied steam. The amounts of water vapor removed from each effect are accurate to approximately ±10%, but the total vapor removed is typical of conventional triple effect evaporation.

FIG. 5 represents the same triple effect evaporator retrofitted to operate on membrane cell liquor containing 32% sodium hydroxide while concentrating the treated solution mined brine to a desired ratio of sodium chloride to water. As illustrated, 500 tons of sodium hydroxide is concentrated to 50% sodium hydroxide product in the first effect and flash tank of the evaporator while a brine slurry of the desired sodium chloride to water ratio is produced in the second and third effects. Here again, condensate flash recuperation and other heat recuperators are omitted for simplicity. In FIG. 5, brine containing 70,000 #/hr NaCl and 205,000 #/hr $H_2O$ making a total of 275,000 #/hr is introduced into the third effect body as in the description given in reference to FIG. 4, above. In this example 70,000 #/hr NaCl and 113,000 #/hr $H_2O$ are exited from the second effect body making a total of 183,000 #/hr, Steam, 67,000 #/hr, is supplied to the first effect steam chest. 45,500 #/hr NaOH and 97,900 #/hr $H_2O$ are also introduced into the first effect unit, this stream totaling 143,400 #/hr. The caustic soda exiting contains 45,500 #/hr NaOH and 45,500 #/hr $H_2O$ for a total of 91,000 #/hr. Thus the total water removed in vapor streams 31, 37, 41, & 49 equals 144,400 #/hr. Steam consumption is 67,000 #/hr and short tons of NaOH produced equals 22.75 tons per hour. As shown by comparison of FIGS. 4 and 5, the steam required in the converted system is approximately 52% of the steam originally required.

This method of conversion is not restricted with respect to the number of evaporator effects, the number of effects used with caustic or salt or the specific operating conditions indicated in FIG. 5. The selection of membrane cells and membrane cell operating conditions, such as amount of brine depletion and cell liquor caustic soda content, will determine the best method of optimizing total energy savings, including the number of effects used for caustic evaporation versus brine evaporation, but the system is flexible and can be readily adapted to suit the operating conditions selected.

Further, the vapor removal load on the retrofitted triple effect in FIG. 5 is approximately 57% of the vapor removal load in FIG. 4. This vapor load reduction, coupled with a reduced boiling point elevation resulting from evaporating brine instead of caustic soda in the second and third effects, offers up to 50% reserve evaporator capacity in the retrofitted plant.

The specific membrane cells, secondary brine treatment systems and anolyte tank systems selected will have a bearing on the detailed design of the plant installation in accordance with this invention. It should be noted that the technology of membrane cells is improving rapidly, especially in membrane performance. For example, a few years ago there was a large heat load to be removed from membrane cells. New membranes and operating techniques which allow operation at lower voltage and power consumption have significantly reduced the heat available from the cell to concentrate the caustic liquor or reconstitute the depleted brine. Any available heat resulting from the electrolysis process may be used in accordance with our invention, such as in preheating the brine prior to the primary purification treatment.

Further, in converting from a diaphragm cell plant to a membrane cell plant, the higher purity membrane cell caustic may not necessarily be required. In this case, a portion of the purified brine may be mixed with cell liquor from the membrane cell such that upon concentration of the caustic solution, the salt separating out will be sufficient to reconcentrate the depleted anolyte.

Although this invention has been described using specific drawings and examples and certain specific embodiments thereof have been emphasized, we do not intend that this invention be limited in scope except as expressly defined in the appended claims.

We claim:

1. A process for using sodium chloride brines averaging between about 23% to about 28% NaCl as feed salt for chlor-alkali electrolytic membrane cells, which comprises:
    (a) Subjecting said brine to a brine purification treatment wherein the brine is purified to remove impurities sufficient to make a satisfactory brine feed for electrolysis in chlor-alkali membrane cells,
    (b) Concentrating the so treated brine resulting from Step (a) in an evaporator or slurry concentrator to a slurry containing up to about 30% NaCl solids; and then,
    (c) Combining depleted salt solution resulting from the anode compartment of the membrane cells with the slurry produced by Step (b) to produce a cell brine feed having the desired ratio of salt to water.

2. The process of claim 1 wherein the sodium chloride brine is natural or solution brine.

3. The process of claim 1 wherein the brine is made from rock salt, solar salt or by-product salt.

4. The process of claim 1 wherein a portion of the brine produced by Step (a) is combined directly with the depleted salt solution in Step (c) while the remaining portion of the brine is concentrated to a slurry in Step (b) and then combined in Step (c).

5. The process of claim 1 wherein the brine is subjected to a primary purification treatment, then concentrated to a slurry, then mixed with the depleted salt solution resulting from the electrolysis, said mixture then being subjected to a secondary brine purification to remove any remaining impurities detrimental to the membrane cell electrolysis.

6. The process of claim 1 wherein the brine used as starting material is concentrated in a slurry concentrator to produce a salt slurry containing about 12% to about 21% NaCl solids content.

7. A process for retrofitting an existing chlor-alkali diaphragm cell plant having caustic evaporator effects to accommodate energy efficient membrane cells while at the same time allowing for use of the major components of equipment from said diaphragm cell plant which comprises:
    (a) Installing membrane cells and auxiliary electrical equipment as required in replacement of the diaphragm cells and electrical equipment in said plant installation,
    (b) Adding a secondary brine treatment process,
    (c) Converting at least one of the evaporator effects used to concentrate the diaphragm cell caustic to an evaporator effect adapted to produce a salt slurry from a brine feed,
    (d) Feeding purified brine to said evaporator and concentrating said solution to a slurry containing up to 30% solid salt,
    (e) Combining depleted salt solution resulting from the anode compartments of the membrane cells installed in said retrofitted plant installation with the slurry produced in Step (c) to produce a brine feed having the desired ratio of salt to water,
    (f) Employing the remaining evaporator effects for concentration of the caustic liquor produced by the cells to produce the desired concentration of caustic soda,
    (g) Employing the vapors produced from the evaporation of Step (f) as the primary heat source for the salt concentration in Step (c).

8. The process of claim 7 wherein the brine employed as salt feed in said plant is natural or solution mined brine having an average concentration of salt of between about 23% to 28% NaCl.

9. The process of claim 8 wherein the brine is concentrated in Step (c) to a slurry varying between about 12% and 21% crystalline salt.

10. The process of claim 9 wherein the depleted salt solution resulting from the anode compartment is increased in dissolved salt content from about 10% to 23% to the desired dissolved salt content required for the operation of the membrane cell.

* * * * *